(12) United States Patent
Takenaka et al.

(10) Patent No.: US 6,575,865 B2
(45) Date of Patent: Jun. 10, 2003

(54) DRIVING APPARATUS

(75) Inventors: Masayuki Takenaka, Anjo (JP); Takeshi Hara, Anjo (JP); Miyoshi Kawaguchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/942,677

(22) Filed: Aug. 31, 2001

(65) Prior Publication Data

US 2002/0060099 A1 May 23, 2002

(30) Foreign Application Priority Data

Oct. 12, 2000 (JP) ........................................ 2000-312325

(51) Int. Cl.⁷ ............................................. F16H 37/06
(52) U.S. Cl. ........................ 475/5; 180/65.2; 180/65.4; 180/65.6
(58) Field of Search ................................ 74/661, 665 F, 74/665 G, 665 GA; 475/198, 200, 206, 5; 180/65.2, 65.6, 65.4; B60K 6/02

(56) References Cited

U.S. PATENT DOCUMENTS

| 5,730,675 A | * | 3/1998 | Yamaguchi | 192/218 |
|---|---|---|---|---|
| 5,788,006 A | * | 8/1998 | Yamaguchi | 180/65.2 |
| 5,799,744 A | * | 9/1998 | Yamaguchi et al. | 180/65.2 |
| 5,806,617 A | * | 9/1998 | Yamaguchi | 180/65.2 |
| 5,823,282 A | * | 10/1998 | Yamaguchi | 180/65.2 |
| 5,875,691 A | * | 3/1999 | Hata et al. | 475/5 |
| 5,893,812 A | * | 4/1999 | Narai et al. | 475/204 |
| 5,915,489 A | * | 6/1999 | Yamaguchi | 180/65.2 |
| 5,943,918 A | * | 8/1999 | Reed et al. | 192/219.5 |
| 5,993,169 A | | 11/1999 | Adachi et al. | |
| RE36,678 E | * | 5/2000 | Moroto et al. | 180/65.4 |
| 6,409,623 B1 | * | 6/2002 | Hoshiya et al. | 475/5 |

FOREIGN PATENT DOCUMENTS

| JP | 9-053603 | 2/1997 |
|---|---|---|
| JP | 10-89446 | 4/1998 |
| JP | 2001-190047 | 7/2001 |

* cited by examiner

*Primary Examiner*—Richard M. Lorence
*Assistant Examiner*—David D. Le
(74) *Attorney, Agent, or Firm*—Oliff & Berridge, PLC (57) ABSTRACT

A driving apparatus including electric motors and a differential device that are disposed in a relation of mutually parallel axes, a gear train that operatively couples these components through parallel shafts, and a hydraulic pressure generating device. The gear train including counter drive gears disposed on electric motor axes, a counter driven gear disposed on a countershaft that runs parallel with the electric motor axes and engaged with the counter drive gears, and a differential drive pinion gear disposed on the countershaft and engaged with a differential ring gear disposed on an axis of the differential device, wherein the hydraulic pressure generating device is disposed in a clearance space created between gears of the gear train when the gear train is viewed in an axial direction.

14 Claims, 8 Drawing Sheets

DRIVING APPARATUS

BACKGROUND OF THE INVENTION

1. Field of Invention

The invention relates to a driving apparatus for automobiles and, more particularly, to a hydraulic pressure generating device for the supply of hydraulic pressure in an apparatus for driving an electric vehicle or a hybrid driving apparatus.

2. Description of Related Art

An apparatus for driving an electric vehicle and a hybrid driving apparatus are known as apparatuses for driving automobiles that use an electric motor (including a generator used as an electric motor in this specification) as a driving source. Since the electric motor is subjected to use under sharp fluctuations in load in such a driving apparatus, the driving apparatus must be provided with a hydraulic pressure generating device and a hydraulic circuit to not only lubricate different mechanical components of the driving apparatus, but also to cool the electric motor under heavy loads and, moreover, to lubricate a gear train if it is included therein for power transmission, and control engagement of a friction device if one is included therein.

An example of a known hydraulic pressure generating device is disclosed in, for example, Japanese Patent Application Laid-Open Publication No. HEI 10-89446. Disclosed in this publication is a hydraulic pressure generating device (20; a reference numeral assigned for drawings in the corresponding publication; the same applies to figures in parentheses hereunder) that is connected, through two one-way clutches (36, 38), to a carrier shaft (127) coupled to an engine (150) and a ring gear shaft (126) coupled to a motor (MG2) and that supplies a planetary gear (120) and other components with a lubricating oil.

An example of a known hydraulic circuit, in which an oil pump (51) driven by an engine (11) is used as a hydraulic pressure generating device, is disclosed in Japanese Patent Application Laid-Open Publication No. HEI 9-53603. This hydraulic circuit is provided with a first oil passage (A) through which an oil pressure having a required line pressure is introduced to a brake (28). It is further provided with, as a sixth oil passage (F), an oil passage for a lubricating system through which the oil pressure is sent to different parts of a driving system comprising power drive transmission elements, such as a countershaft (31) and a differential device (36), and, as a seventh oil passage (G), an oil passage for a cooling system through which a cooling oil is sent to a generator (16) and a driving motor (25).

The hydraulic pressure generating device (20) disclosed in the above-mentioned Publication No. HEI 10-89446 is formed integrally with a case (147) on an end portion opposite to the engine (150), which presents a disposition problem in terms of an axial length of a power output device becoming extremely long. In terms of a configuration for oil passages, too, the length of an oil passage for the supply of oil pressure to the planetary gear (120) becomes long in conjunction with the above disposition problem. This makes the structure of oil passages in the case (147) complicated, which increases the number of man-hours and cost expended in machining. It also increases oil passage resistance, presenting problems of an increased amount of power loss and oil leak in the hydraulic pressure generating device (20).

Such problems involved in the oil passage structure become particularly conspicuous in a case, in which the oil pressure from the oil pump (51), used as the hydraulic pressure generating device, is supplied to a plurality of locations (brakes, parts of a driving system, and an electric motor) for use in a plurality of purposes (servo pressure control, lubrication, and cooling), as in the art disclosed in the above-mentioned Publication No. HEI 9-53603. It is therefore necessary to dispose the hydraulic pressure generating device in an optimum position, at which the size of the driving apparatus is not affected and, at the same time, the lengths of oil passages to different locations are kept short.

SUMMARY OF THE INVENTION

The invention thus provides a driving apparatus, in which a hydraulic pressure generating device is disposed as efficiently as possible in an internal space thereof from viewpoints of both its own disposition position as well as a configuration of associated oil passages.

To achieve the foregoing, a driving apparatus according to the invention is provided with an electric motor and a differential device that are disposed in a mutually parallel axial relationship, a gear train that operatively couples the electric motor and the differential device by means of a parallel shaft, and a hydraulic pressure generating device. The driving apparatus is characterized in that, in the gear train that comprises a counter drive gear disposed on an axis of the electric motor, a counter driven gear is disposed on a countershaft that runs parallel with the axis of the electric motor and engaged with the counter drive gear, and a differential drive pinion gear is disposed on the countershaft and engaged with a differential ring gear disposed on an axis of the differential device, with the hydraulic pressure generating device disposed in a clearance space created between each of the two adjacent gears of the gear train with the gear train viewed in an axial direction.

In the construction according to a first exemplary aspect of the invention, the hydraulic pressure generating device is disposed in a clearance space created between each of the two adjacent gears of the gear train, which makes it possible to dispose the hydraulic pressure generating device so as not to significantly affect the size of the driving apparatus.

More precisely, the above-mentioned driving apparatus may be constructed such that the electric motor, gear train, and the differential device are housed in a case for the driving apparatus, and the case for the driving apparatus is provided with an intermediate wall that separates at least an electric motor chamber, in which the electric motor is housed, from a gear chamber that houses the gear train with the hydraulic pressure generating device embedded in the intermediate wall.

In the construction according to an embodiment of the first exemplary aspect of the invention, disposing the hydraulic pressure generating device does not require any additional special member, which contributes to a simplified structure and a resultant reduced cost, in addition to a reduced installation space requirement.

It is also effective if a valve body having a circuit formed therein for distributing a pressure oil generated by the hydraulic pressure generating device into the electric motor chamber and the gear chamber is provided in a fixed condition in the intermediate wall to cover the hydraulic pressure generating device.

In the construction according to another embodiment the first exemplary aspect of the invention, the path between the hydraulic pressure generating device and the valve body becomes the shortest, which allows power loss of the hydraulic pressure generating device to be reduced.

In case when the valve body that has the circuit formed therein for distributing the oil pressure generated by the hydraulic pressure generating device into the electric motor chamber and the gear chamber is provided, it would be even more effective if such a valve body has the hydraulic pressure generating device built therein and is embedded in the intermediate wall.

In the construction according to yet another embodiment the first exemplary aspect of the invention, the path between the hydraulic pressure generating device and the valve body becomes the shortest, which allows power loss of the hydraulic pressure generating device to be reduced. Moreover, the valve body as well as the hydraulic pressure generating device is embedded in the intermediate wall, which eliminates the need of any additional special member for disposing the valve body and the hydraulic pressure generating device, which in turn contributes to a simplified structure and a resultant reduced cost, in addition to a reduced installation space requirement.

In case the driving apparatus is further provided with an engine, it would be effective if the gear train is disposed between the engine and the electric motor in a positional relationship in an axial direction.

In the construction according to still another embodiment the first exemplary aspect of the invention, each of the foregoing effects can be achieved in a hybrid driving apparatus.

In case the driving apparatus is further provided with a planetary gear set that mutually and operatively couples the engine, the electric motor, and the counter drive gear, it would be possible to provide a structure, in which an isolating wall is provided that defines a planetary chamber that accommodates the planetary gear set in cooperation with the intermediate wall.

In the construction according to another embodiment of the first exemplary aspect of the invention, each of the foregoing effects can be achieved in a hybrid driving apparatus, in which the engine and the electric motor are operatively coupled to the gear train through the planetary gear set to allow differential movement.

In addition, in case the driving apparatus is further provided with a braking device that stops rotation of the electric motor through the supply of pressure oil generated by the hydraulic pressure generating device, it would be effective if such a braking device is disposed in the isolating wall.

In the construction according to yet another embodiment of the first exemplary aspect of the invention, the oil passage used for engaging and releasing the brake device that requires the supply of a particularly high hydraulic pressure and supply response, among other points to which hydraulic pressure is supplied, can be routed along the shortest path via the intermediate wall and the isolating wall, which results in reduced power loss of the hydraulic pressure generating device from an overall viewpoint of the driving apparatus.

The driving apparatus according to the invention includes the electric motor and the gear train, that operatively couples the electric motor to a wheel, housed in the case for the driving apparatus. The case for the driving apparatus is provided with the intermediate wall that separates at least the electric motor chamber, in which the electric motor is housed, from the gear chamber that houses the gear train, and the isolating wall that defines a separate chamber in either the electric motor chamber or the gear chamber in cooperation with the intermediate wall, and is characterized in that the hydraulic pressure generating device is disposed in the intermediate wall and the braking device that stops rotation of the electric motor through the supply of oil pressure generated by the hydraulic pressure generating device is disposed in the isolating wall.

In the construction according to a second exemplary aspect of the invention, disposing the hydraulic pressure generating device does not require any additional special member, which contributes to a simplified structure and a resultant reduced cost, in addition to a reduced installation space requirement. Moreover, the oil passage used for engaging and releasing the brake device that requires the supply of a particularly high hydraulic pressure and supply response among other points to which hydraulic pressure is supplied can be routed along the shortest path via the intermediate wall and the isolating wall, which results in power loss of the hydraulic pressure generating device being reduced from an overall viewpoint of the driving apparatus.

In this case also, it would be effective if the gear train is disposed between an engine, if the driving apparatus is provided therewith, and the electric motor in the positional relationship in the axial direction.

In the construction according to an embodiment of the second exemplary aspect of the invention, each of the foregoing effects can be achieved in a hybrid driving apparatus.

Likewise, in case the driving apparatus is further provided with the engine, electric motor, and a planetary gear set that mutually and operatively couples one of the gears in a gear train that operatively couples the electric motor to a wheel, it would be effective if the planetary gear set is housed in the separate chamber.

In the construction according to another embodiment of the second exemplary aspect of the invention, each of the foregoing effects can be achieved in a hybrid driving apparatus, in which the engine and the electric motor are operatively coupled to the gear train through the planetary gear set to allow differential movement.

BRIEF DESCRIPTION OF THE DRAWINGS

Various embodiments of the invention will be described with reference to the following figures, wherein.

DETAILED DESCRIPTION OF PREFERRED EMBODIMENTS

Figure 1:
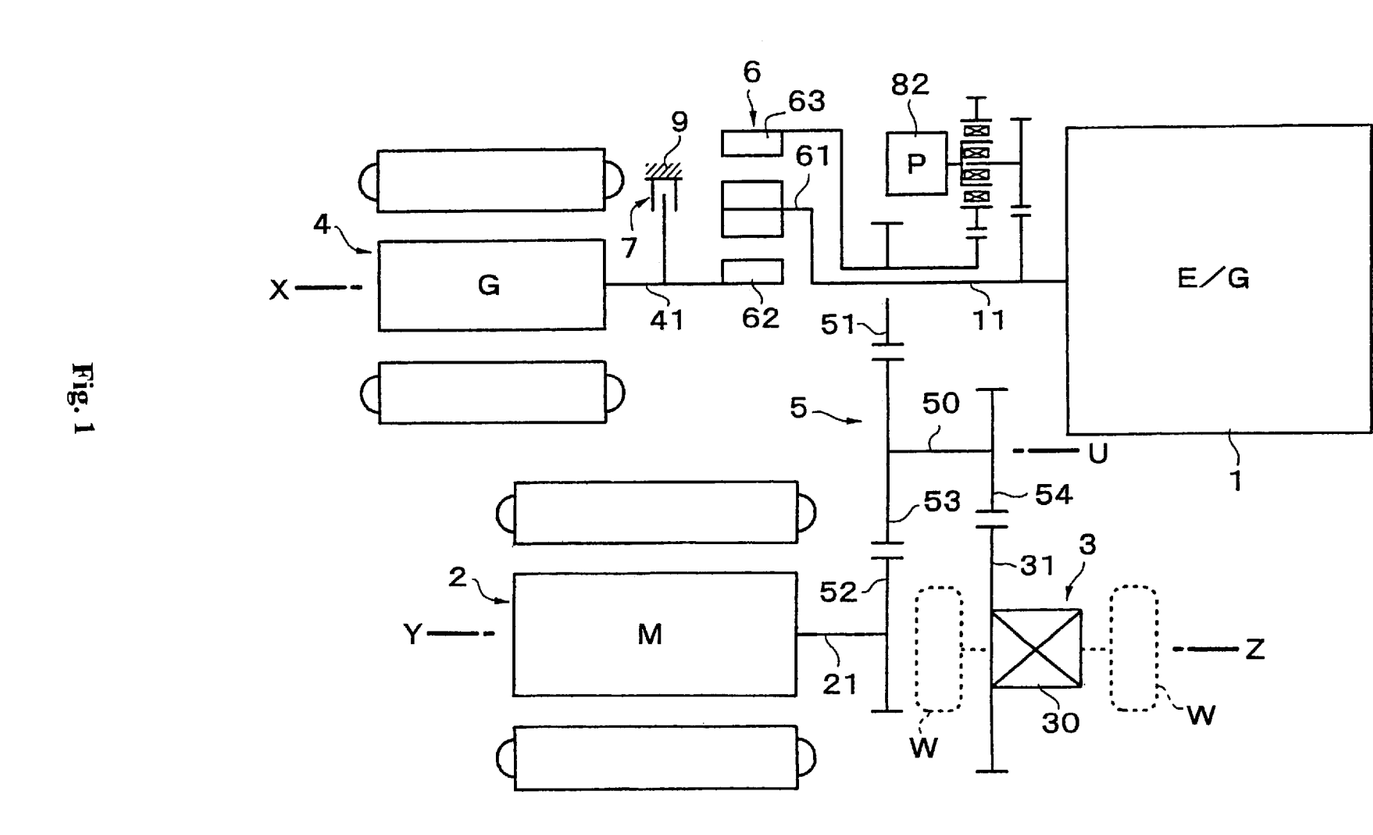
FIG. 1 is a schematic block diagram showing a hybrid driving apparatus to which the invention is applied.

The embodiments of the invention will be explained with reference to the attached drawings. FIG. 1 is a schematic block diagram showing a hybrid driving apparatus to which the invention is applied. This apparatus is a transversely disposed type driving apparatus, in which an internal combustion engine (E/G) (hereinafter referred to as the engine) 1, an electric motor (M) (hereinafter referred to as the motor) 2, and a differential device 3 are disposed on different axes (these axes are hereunder in the explanation of the embodiments referred to as an engine axis X, a motor axis Y, and a differential axis Z) that run parallel with each other. In addition, a generator (G) (hereinafter referred to as the generator) 4 is disposed on the same axis as the engine 1. A gear train 5 is disposed to provide a driving coupling, through a parallel shaft, to the engine 1, motor 2, generator 4, and differential device 3. A countershaft 50, that forms part of the gear train 5, is disposed on an axis (referred to as a countershaft axis U in the same manner as in the foregoing axes) different from any of the foregoing axes. A planetary gear set 6 is disposed on the engine axis X to provide a differential driving coupling for the engine 1, generator 4, and a counter drive gear 51 of the gear train 5. In addition, a brake device 7 is also disposed on the engine axis X to stop rotation of the generator 4 as necessary.

Specific driving coupling relations of the elements on each of the foregoing axes in this driving apparatus is such that an output shaft 11 on the engine axis X is coupled to a carrier 61 of the planetary gear set 6, an output shaft 41 of the generator 4 is coupled to a sun gear 62 of the planetary gear set 6 and, at the same time, to a driving apparatus case 9 through the brake device 7, and a ring gear 63 of the planetary gear set 6 is coupled to the counter drive gear 51 that forms part of an output member on the engine axis X. A counter drive gear 52, coupled to an output shaft 21 of the motor 2, is an output element on the motor axis Y. These two counter drive gears 51, 52 are brought into mesh with a counter driven gear 53 disposed on the countershaft axis U to be operatively coupled to the countershaft 50. The countershaft 50 brings a differential drive pinion gear 54 disposed on the axis U thereof into engagement with a differential ring gear 31 secured to a differential case 30 of the differential device 3, thus providing drive for the differential device 3. A reference symbol W in FIG. 1 represents a wheel coupled to a side gear, not shown, of the differential device 3.

Figure 2:
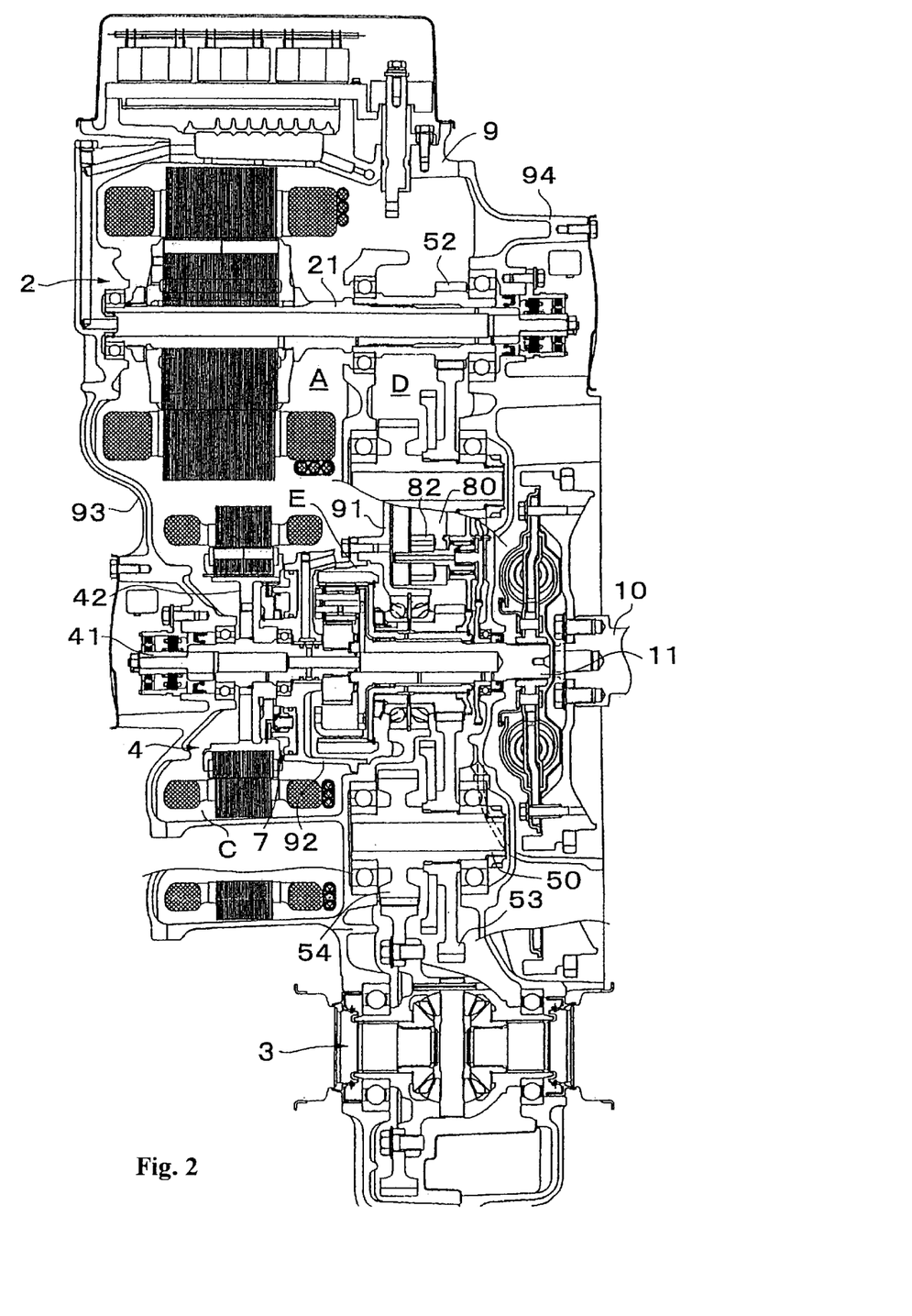
FIG. 2 is an axial developed sectional view showing the driving apparatus.
Figure 3:
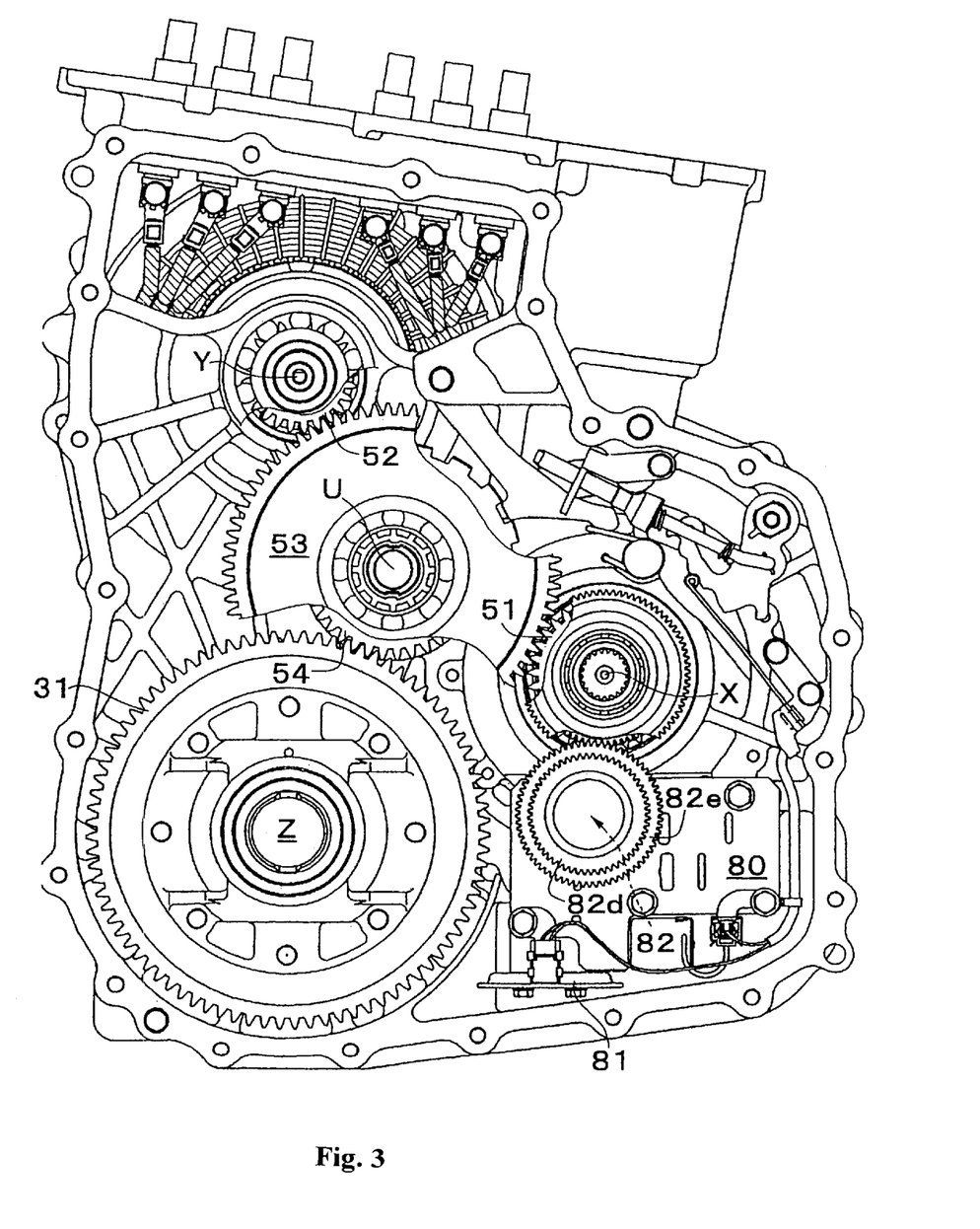
FIG. 3 is a side view showing the driving apparatus.

FIGS. 2 and 3 show details of the construction of the driving apparatus in an axial developed sectional view and a side view. Referring to FIG. 2, the motor 2, generator 4, gear train 5, and the differential device 3 are housed in the driving apparatus case 9. The driving apparatus case 9 is provided with a front cover 94 serving as a frontal wall and a rear cover 93 serving as a rear wall, covering openings on both sides of a main body portion thereof. The driving apparatus case 9 is provided, in the main body portion thereof, with an intermediate wall 91 that separates a motor chamber A and a generator chamber C accommodating the motor 2 and the generator 4, respectively, from a gear chamber D accommodating the gear train 5. An oil pump 82, functioning as the hydraulic pressure generating device to be described in detail later, is embedded in the intermediate wall 91. The output shaft 11 is coupled to a crankshaft 10 of an engine by way of a flywheel-and-damper device. The output shaft 21 of the motor 2 is a rotor shaft, with which a gear shaft with the counter drive gear 52 formed integrally therewith is in splined engagement. The countershaft 50 is integrally formed with the differential drive pinion gear 54, with which the counter driven gear 53 is in splined engagement.

The brake device 7 is provided to prevent a driving loss from being generated due to rotation by a reaction torque when no power generation is required by latching the rotor shaft 41 of the generator 4 to the driving apparatus case 9 as may be necessary. The brake device 7 uses a rotor 42 as a brake drum and has frictional engagement members engaged with the drum and the driving apparatus case 9. The detailed construction of this brake device 7 will be explained later.

FIG. 3 shows the actual positional relationships among the axes X, Y, Z, and U. The differential axis Z is disposed on the bottom part of the apparatus, the lowest in level of all these axes, the engine axis X is disposed diagonally upward therefrom (toward a front side when the apparatus is mounted on a vehicle), the motor axis Y is disposed upward of the differential axis Z, and the countershaft axis U is disposed at roughly the center of the foregoing three axes X, Y, and Z.

Referring to FIG. 1, in the driving apparatus of such a configuration, while the motor 2 and the wheel W are directly coupled to each other through the gear train 5 in terms of power transmission, apart from differential rotation accomplished by the differential device 3, the engine 1 and the generator 4 are differentially coupled to the gear train 5 through the planetary gear set 6 in terms of power transmission. This makes it possible to operate the vehicle through the driving of the wheel W by using a motor output only, an engine output only, or by assisting the engine output with the motor output, and through charging a battery by driving the generator 4 by means of the output from the engine 1 in accordance with the battery state of charge and operating loads.

Figure 4:
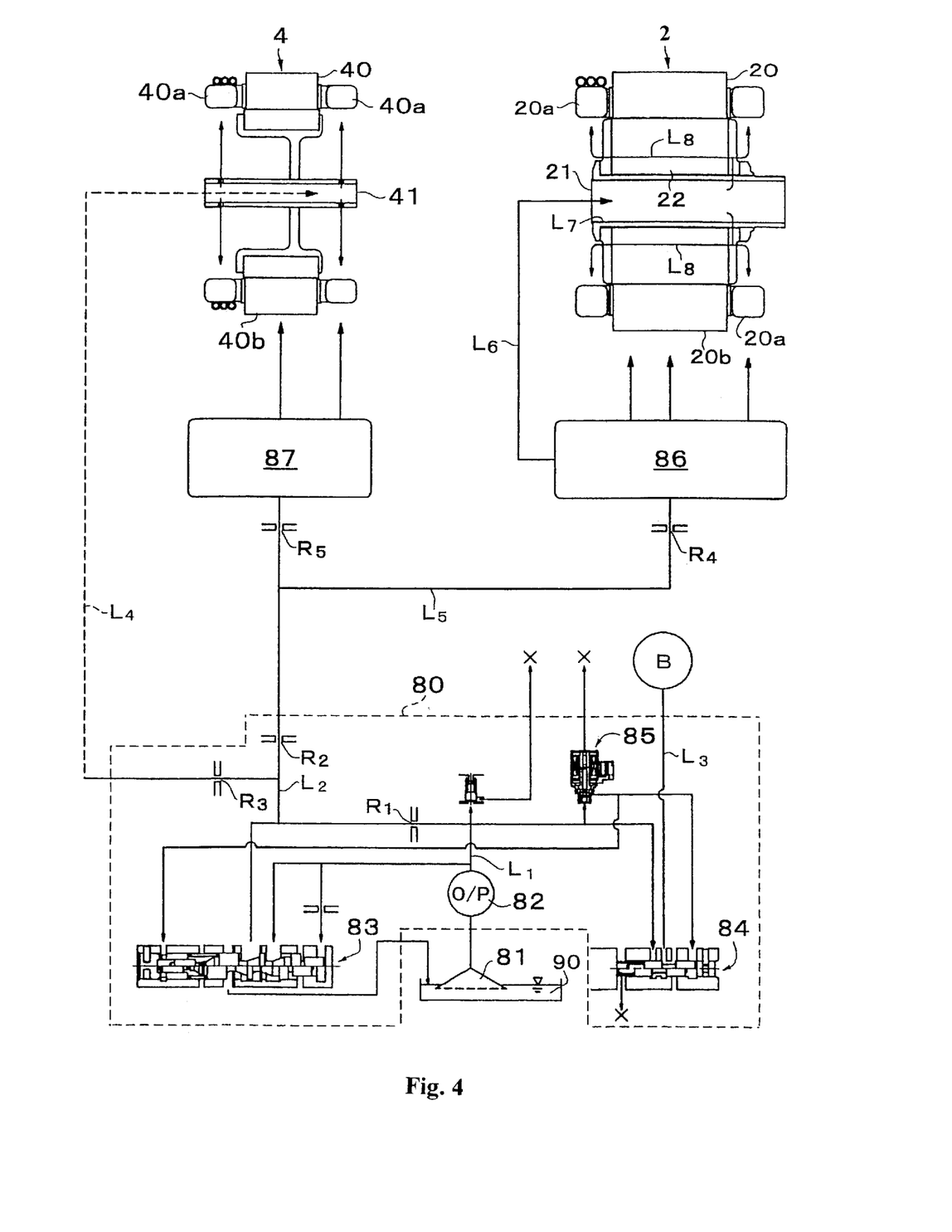
FIG. 4 is a circuit diagram showing the hydraulic system for the driving apparatus.

The driving apparatus is provided with a hydraulic circuit for cooling the motor 2 and generator 4, controlling the brake device 7, and lubricating and cooling various mechanical components. FIG. 4 shows a circuit configuration where the hydraulic circuit is provided with the major components housed in a valve body 80 indicated by a dotted-line frame in the figure. Namely, an oil pump 82, as the hydraulic pressure generating device, pumps oil via a strainer 81 from an oil sump 90 on a bottom portion of the driving apparatus case 9 and delivers it to the circuit, a regulator valve 83 generates circuit line pressure used for controlling the brake device 7 (see FIGS. 1 and 2), a brake valve 84 selects between a supply and an exhaust of a hydraulic pressure for a hydraulic servo (B) of the brake device 7, and a solenoid valve 85 controls the position of the brake valve 84. The valve body 80 forms a control circuit that delivers oil, as a refrigerant and a lubricating oil for cooling the motor 2 and generator 4, to a supply oil passage $L_2$ of a circulating passage and controls communication of a supply oil passage $L_3$ of the hydraulic servo (B) of the brake device 7 with a line pressure oil passage $L_1$ and drain communication.

The line pressure oil passage $L_1$ on a delivery side of the oil pump 82 is branched off, one connecting to the supply oil passage $L_2$ of the circulating circuit through the regulator valve 83 and the other connecting to the supply oil passage $L_3$ of the hydraulic servo (B) of the brake device 7 through the brake valve 84. The line pressure oil passage $L_1$ and the supply oil passage $L_2$ are connected to each other through an orifice $R_1$. The supply oil passage $L_2$ of the circulating circuit is branched off, being routed by way of orifices $R_2$ and $R_3$, respectively. One branch is connected to an oil passage in the rotor shaft 41 of the generator 4 by way of an oil passage $L_4$ in the case shown by a dashed line in the figure. The other branch is further branched off in an oil passage $L_5$ in the case, being routed by way of orifices $R_4$ and $R_5$, respectively, one connecting to an oil sump 86 for the motor 2 and the other connecting to an oil sump 87 for the generator 4, both provided on an upper portion of the driving apparatus case 9.

Cooling of the motor 2 is accomplished as follows. Oil is introduced to an oil passage $L_7$ in the output shaft 21 from the oil sump 86 via an oil passage $L_6$ in the case. The oil then passes through an oil passage $L_8$ in a rotor 22, being hurled toward a coil end 20a of a stator 20 from a terminal end of the oil passage by a centrifugal force produced as a result of rotation of the rotor 22. The oil cools the rotor 22 as it moves through the oil passage in the rotor 22. While part of the oil that is discharged from both ends of the rotor 22 is sprayed against coil ends 20a on both ends of the stator 20, another part of the oil, directly discharged from the refrigerant sump 86, is sprayed against a stator core 20b and the coil ends 20a, thus cooling the respective portions. Likewise, the generator 4 is cooled as follows. Oil that is discharged by a centrifugal force from an oil passage in a rotor shaft 41 of the generator 4 by way of an oil hole made in a diametric direction is sprayed against coil ends 40a on both ends of a stator 40, while another part of the oil, discharged from the refrigerant sump 87, is sprayed against a stator core 40b and the coil ends 40a. The oil, the temperature of which has increased through heat exchange during the course of cooling the motor 2 and generator 4, drips onto a bottom portion of the driving apparatus case 9 or flows down along a case wall back to the oil sump 90 located downward in the driving apparatus.

Figure 5:
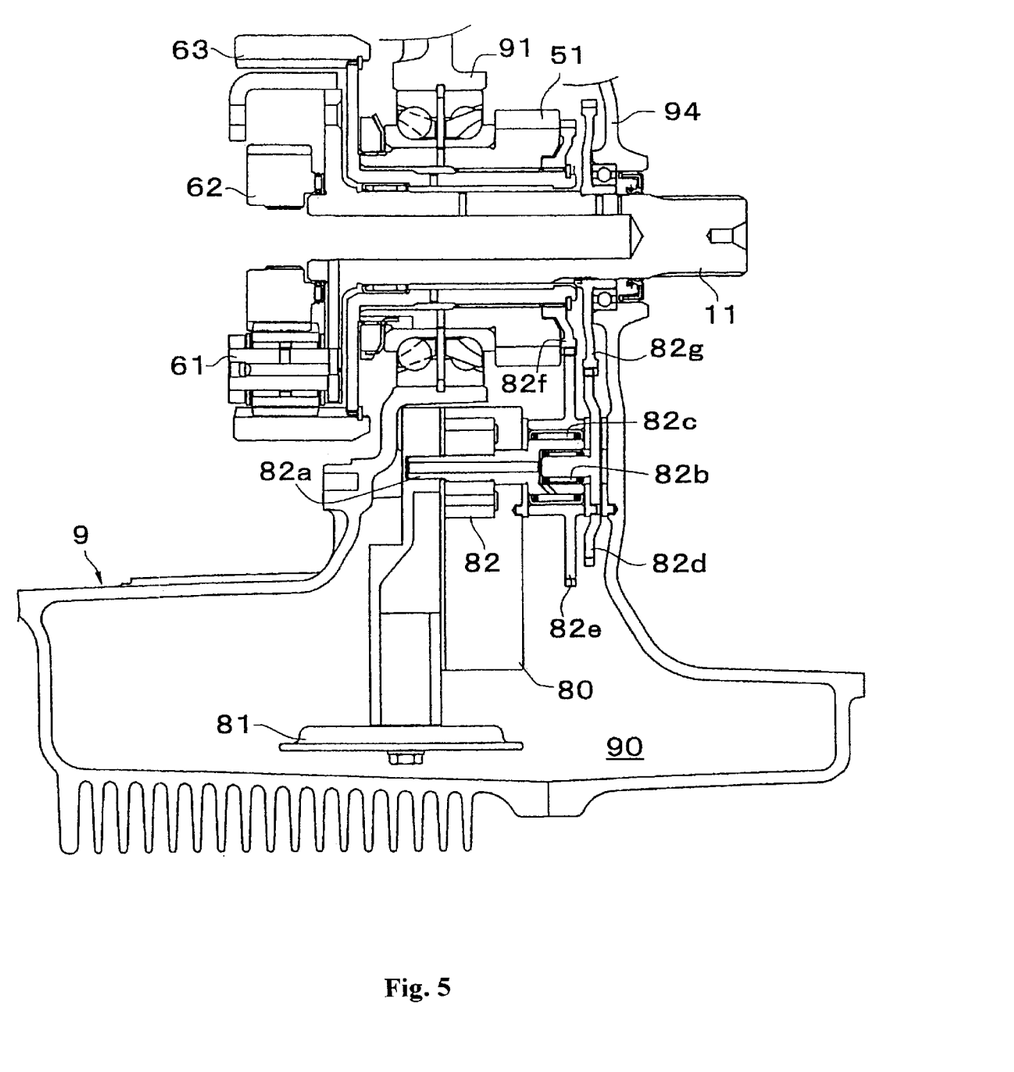
FIG. 5 is an axial sectional view showing the details of the portion in which the valve body is disposed.

Referring to FIGS. 2 and 3, the hydraulic pressure generating device is embedded in the intermediate wall 91 by making use of a clearance space created between each of the two adjacent gears of the gear train 5 namely, from a mechanical viewpoint, the valve body 80, having the built-in oil pump 82, is located ahead of the differential axis Z (see FIG. 3) and, at the same time, downward the engine axis X. Referring to FIG. 5 which is an enlarged view showing more details, a pump driving shaft 82a of the oil pump 82 is connected to different driven gears 82d, 82e via two one-way clutches 82b, 82c fitted in a relationship of an inside diameter and an outside diameter. These driven gears are engaged with a drive gear 82f secured to the output shaft 11 on the engine side and to a ring gear coupling shaft alongside of the counter drive gear 51 on the engine axis X and with a drive gear 82g secured to the output shaft 11 on the engine side, respectively, to establish a driving coupling. The driving coupling such as this one, that uses two systems of one-way clutches 82b, 82c, is intended to transmit rotation of the drive gear 82f or 82g, whichever is faster, to the pump driving shaft 82a, while preventing the slower rotation (including a stationary state and a reverse rotation) from being transmitted to the pump driving shaft 82a, thereby stabilizing the amount of oil delivered and preventing oil from being drawn in by reverse rotation.

Figure 6:
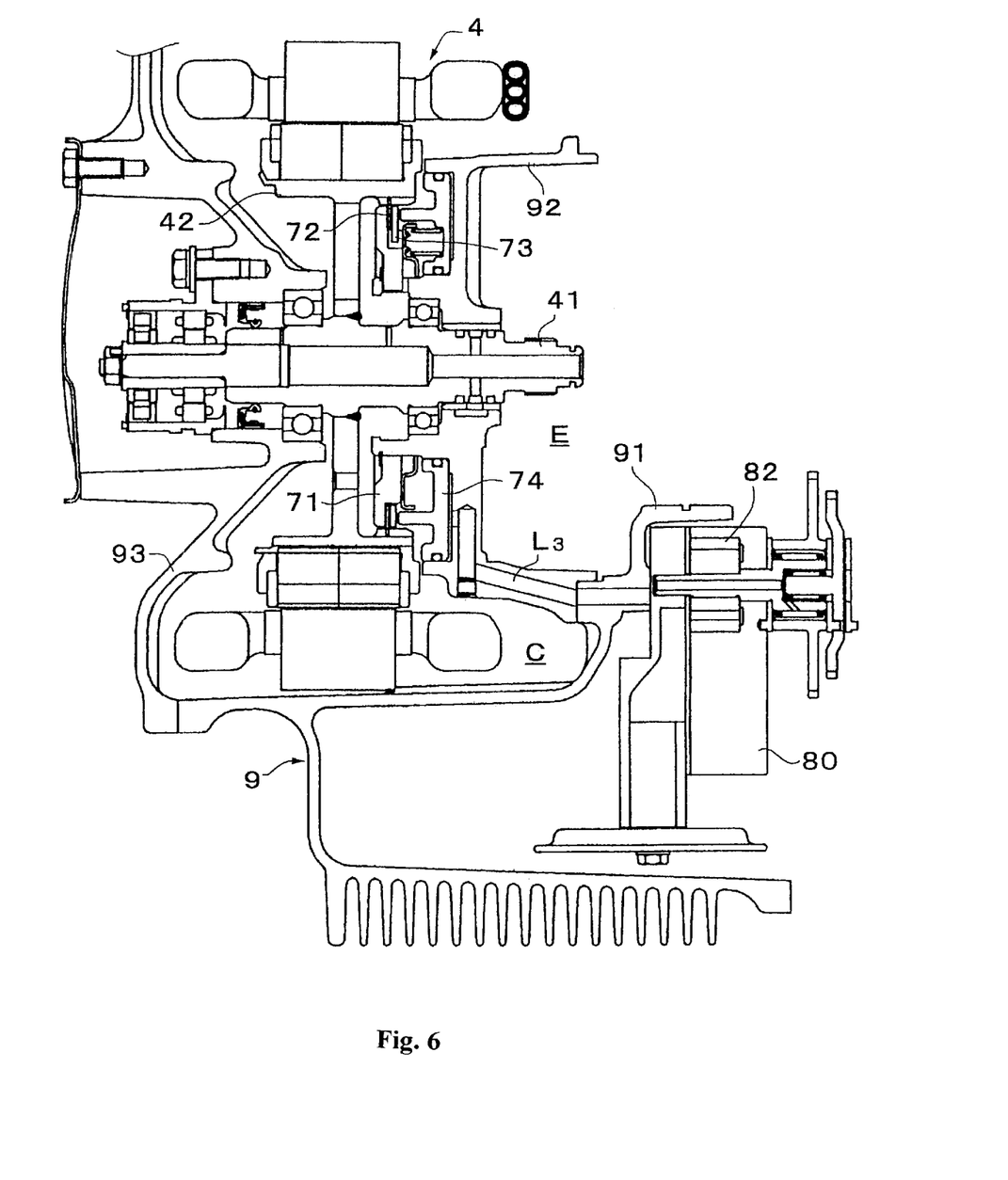
FIG. 6 is an axial sectional view showing the relationship between the brake device and the valve body.

Referring to FIG. 6, which is an enlarged view showing the details of the brake device 7 that is supplied with a hydraulic pressure from the valve body 80, the brake device 7 comprises a brake drum, which is an inner periphery of the rotor 42 of the generator 4, and a brake hub, which is a thick sheet member 71 formed by engaging inner peripheral teeth with engagement teeth that protrude in a form of comb teeth from a flanged portion end face that extends axially from an end face of an isolating wall 92 that defines a planetary chamber E that accommodates the planetary gear set 6 in cooperation with the intermediate wall 91. The brake driver further includes, as friction engagement members, a friction material disk 72, an outer periphery of which is in splined engagement with the inner periphery of the rotor 42, and a separator plate 73, an inner periphery of which is in splined engagement with the outer periphery of the hub, and a hydraulic servo controlling engagement and disengagement of the friction engagement members built into the isolating wall 92. The hydraulic servo comprises a cylinder formed as an annular groove in an end face of the isolating wall 92 and a piston 74 of an annular shape fitted axially slidably and oil-tightly in the cylinder. An axial flanged portion, that protrudes axially at generally a center of the piston 74 in terms of the inside and outside diameters thereof, is formed as a pressurizing portion opposing the separator plate 73 as a friction engagement member.

The supply oil passage $L_3$ of the hydraulic servo is provided as an oil passage in the driving apparatus case 9. More precisely, the supply oil passage $L_3$ comprises a through oil passage that passes through the intermediate wall 91 of the driving apparatus case 9 and an oil passage that leads into the cylinder from a peripheral wall by way of an end wall of the isolating wall 92. This configuration of oil passages allows the valve body 80 and the cylinder to be communicated with each other at the shortest possible path using the case wall, thus reducing a driving loss of the oil pump 82 and improving a response in the supply of hydraulic pressure to the hydraulic servo.

In the driving apparatus of such a construction as explained heretofore, when a vehicle is run at a constant speed using solely an engine output or through the engine output assisted by a motor output, the output shaft 11 and the counter drive gear 51 turn in the same direction. However, because of a gear ratio involved in the planetary gear 6, the rotating speed of the counter drive gear 51 operatively connected to the ring gear 63 is higher than the rotating speed of the output shaft 11 connected to the carrier 63, which locks the one-way clutch 82c on the outer peripheral end and frees the one-way clutch 82b on the inner peripheral end. As a result, the pump driving shaft 82a is turned by the higher-speed rotation, which means that the oil pump 82 is driven at a high speed corresponding to the running speed.

On the other hand, when the vehicle is run using solely the engine output with a sufficient battery state of charge (SOC), operation proceeds as follows. Referring to FIG. 4, when the solenoid valve 85 of the valve body 80 is energized, the brake valve 84 is switched, bringing the line pressure from the regulator valve 83 based on a delivery pressure of the oil pump 82 into communication with the oil passage $L_3$ of the driving apparatus case 9, and thereby the line pressure is supplied to the hydraulic servo (B). This engages the brake device 7, mechanically stopping the rotor 42. This latching action by the brake device brings the generator 4 to a stop, thus preventing a driving loss due to unnecessary rotation of the generator 4. The driving state of the oil pump 82 during this period is the same as the foregoing.

When the vehicle runs in a forward direction in a motor-driven mode, on the other hand, the engine 1 is set in a non-driving state and rotation of the output shaft 21 of the motor 2 is transmitted to the counter drive gear 51 through the counter driven gear 53 of the gear train 5. This rotation is transmitted to the pump driving shaft 82a via the drive gear 82f, driven gear 82e, and the one-way clutch 82c on the outer peripheral end for driving the pump, thus driving the oil pump 82 at a speed corresponding to the vehicle running speed involved.

When the vehicle runs in a reverse direction, the motor 2 turns in reverse to turn the counter drive gear 51 in reverse direction. This reverse rotation is transmitted over the same path as in the foregoing, resulting in the gears 82f, 82e, and the one-way clutch 82c on the outer peripheral end turning in reverse. In this case, the one-way clutch 82c on the outer peripheral end is set in a free state, thus eliminating the possibility of the pump driving shaft 82a turning backward.

When the vehicle is stopped or runs in reverse in the motor-driven mode, the generator 4 is made to function as a motor and the counter drive gear 51 and the ring gear 63 formed integrally therewith are stopped or turned in reverse, which turns the carrier 61 and the output shaft 11 formed integrally therewith in a forward direction at a decelerated speed. This rotation of the output shaft 11 is transmitted to the pump driving shaft 82*a* via the drive gear 82*g*, the driven gear 82*d*, and the one-way clutch 82*b* on the inner peripheral end for driving the pump, thus driving the oil pump 82.

According to the first embodiment of the invention, the oil pump 82 is disposed in a clearance space created between gears of the gear train 5, which makes it possible to dispose the oil pump 82 without significantly affecting the size of the driving apparatus as a whole. There is no additional member employed for disposing the oil pump 82, which simplifies the structure and thus reduces cost, in addition to a reduction in space requirement for installation. Moreover, the path between the oil pump 82 and the valve body 80 is relatively short, which reduces a power loss of the oil pump 82. Furthermore, the valve body 80, together with the oil pump 82, is embedded in the intermediate wall 91, thus reducing the installation space requirement. In addition, the oil passage used for applying and releasing the brake device 7, which requires the supply of a particularly high hydraulic pressure and supply response among other points of hydraulic pressure supply, is routed along the shortest path via the intermediate wall 91 and the isolating wall 92. Thus, reducing power loss of the oil pump 82 from an overall viewpoint of the driving apparatus.

Figure 7:
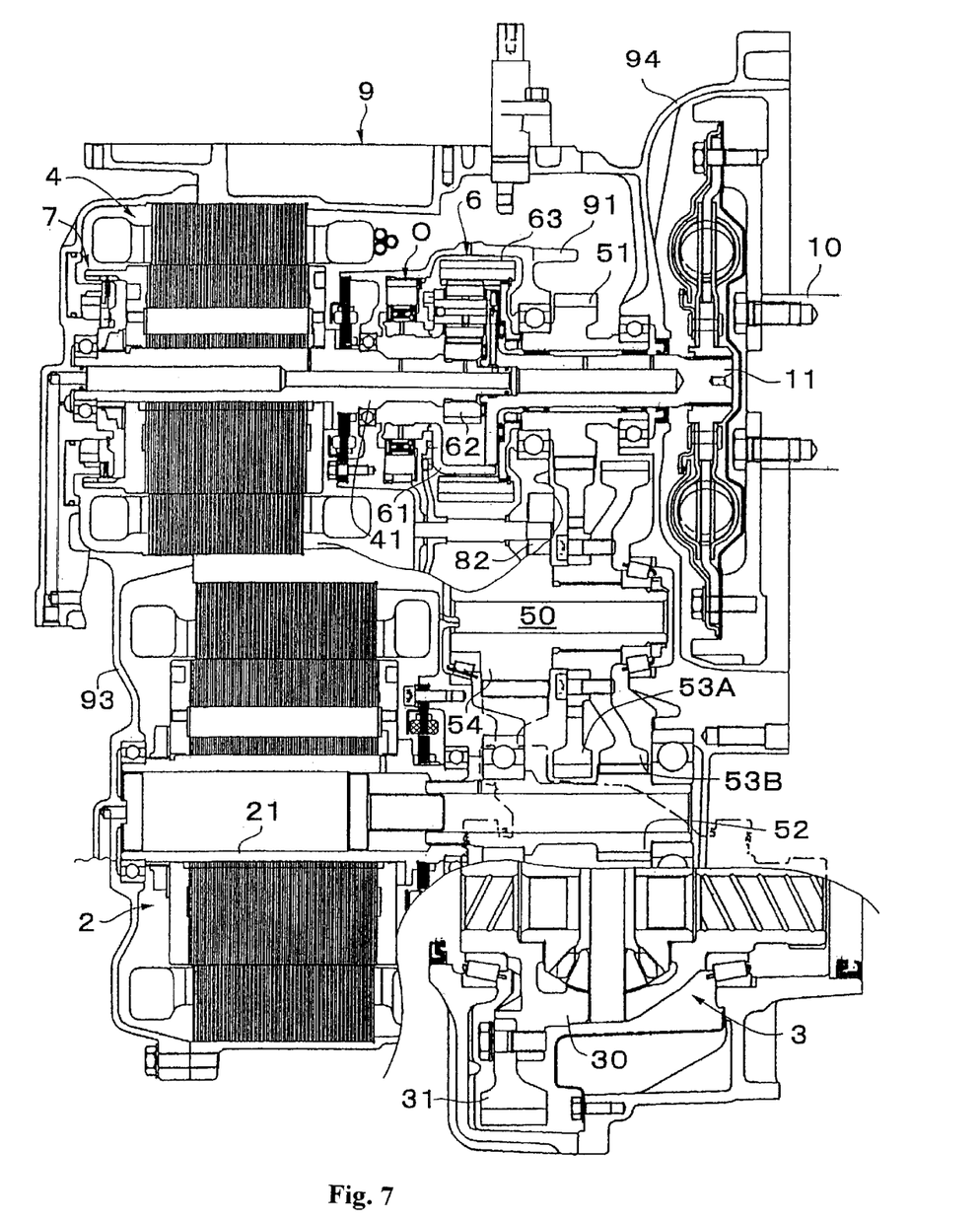
FIG. 7 is an axial developed sectional view showing the hybrid driving apparatus according to the second embodiment of the invention.
Figure 8:
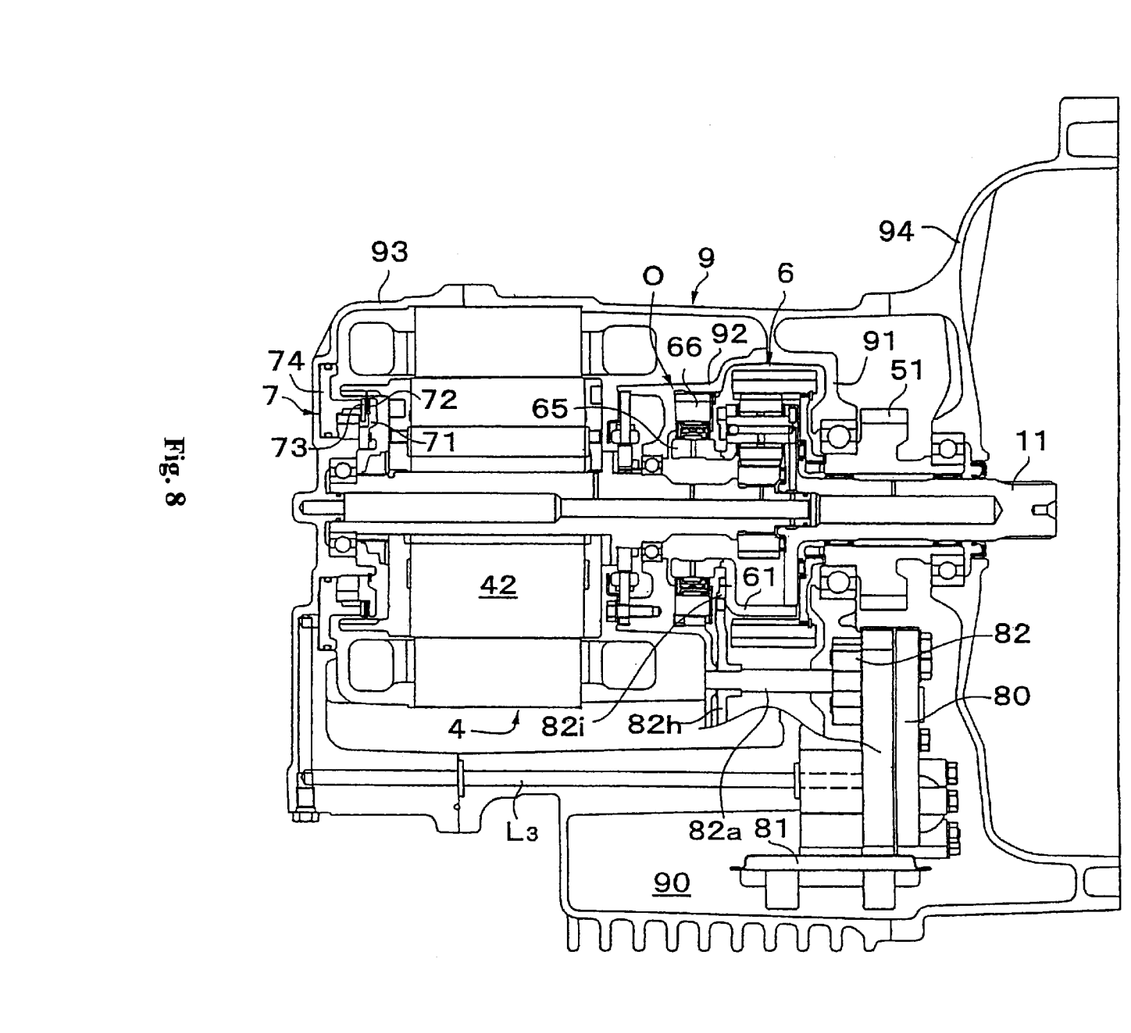
FIG. 8 is an axial sectional view showing the relationship between the brake device and the valve body according to the second embodiment.

FIGS. 7 and 8 represent a second embodiment of the invention. In the driving apparatus of this construction, the structure of the gear train portion is changed to further shorten the axial length of the apparatus.

The differences from the first embodiment will be mainly explained with the explanations of the remaining portions being omitted by assigning the same reference numerals to the like parts. Roughly speaking, the driving apparatus adds a one-way clutch O that connects a carrier 61 of a planetary gear set 6 to a driving apparatus case 9 along an engine axis. The one-way clutch O is provided to prevent a generator 4 from turning in reverse which is described later. Since the one-way clutch O is disposed on an end face side of an isolating wall 92, a brake device 7 is relocated to an outer end side of the generator 4.

Referring to FIG. 8 which is an enlarged view of FIG. 7, the one-way clutch O is supported by an inner race 65 thereof connected to a carrier 51 of the planetary gear set 6 and an outer race 66 thereof in splined engagement with the isolating wall 92.

The placement of the one-way clutch O in this manner eliminates the chance of the generator 4 turning in reverse, which contributes to a simplified construction of a driving mechanism for an oil pump 82. A pump driving shaft 82*a* according to this embodiment comprises a pair of a driven gear 82*h* and a drive gear 82*i* in mutual meshing relationship between the planetary gear set 6 and the one-way clutch O. Especially with the drive gear 82*i*, the pump driving shaft 82*a* is provided as a ring-shaped gear on the carrier 61 of the planetary gear set 6, permitting a driving coupling that requires virtually no space for installation on an output shaft 11.

In addition, the oil pump 82 is built in an intermediate wall 91 of the driving apparatus case 9 and a valve body 80 is fixed to the intermediate wall 91 to cover an end face of the oil pump 82. In this construction, too, the oil pump 82 is virtually connected to the valve body 80, which maintains the coupling structure of the shortest possible oil passage between the two for prevention of any driving loss of the oil pump.

A brake device 7 that is supplied with a hydraulic pressure from the valve body 80 comprises a drum formed by a rotor 42 of the generator 4 and a hub formed by a rear cover 93 of the driving apparatus case 9. The brake device 7 further includes, as friction engagement members, a friction material disk 72, an outer periphery of which is in splined engagement with an inner periphery of an annular flanged portion that protrudes in an axial direction from an end plate of the rotor 42, and a separator plate 73, an inner periphery of which is in splined engagement with an outer periphery of the hub, and a hydraulic servo that controls engagement and disengagement of the friction engagement members built into the rear cover 93. Except that the friction engagement members and parts to be connected by the hydraulic servo differ from the case in the first embodiment, the brake device 7 according to the second embodiment is constructed in substantially the same manner as in the first embodiment.

A supply oil passage $L_3$ of the hydraulic servo according to the second embodiment is provided as an oil passage in the driving apparatus case 9 running from the case to the rear cover 93. In particular, the supply oil passage $L_3$ comprises a through oil passage that passes through the intermediate wall 91 of the driving apparatus case 9 and an oil passage that leads into the cylinder from a peripheral wall of the driving apparatus case 9 by way of a peripheral wall and an end wall of the rear cover 93.

In this driving apparatus, driving the generator 4 as a motor causes a reaction force applied to a carrier 62 of the planetary gear set 6 to turn in reverse. When, at this time, force is made to function as a reaction force element for latching the carrier 62 to the driving apparatus case 9 via the one-way clutch O, an output from the generator 4 can be transmitted to the ring gear 63, thus allowing a driving force, when a vehicle is started, to be increased by simultaneously outputting from the motor 2 and the generator 4 (running in a parallel mode).

Other differences are, in this driving apparatus, the counter driven gear of the gear train 5 is provided as separate gears 53A, 53B that are engaged with counter drive gears 51, 52, respectively, on the engine and the motor sides.

According to the second embodiment, the same effects can be derived as those of the first embodiment, except for the effect of shortening the supply oil passage $L_3$ of the brake device 7. In this embodiment, the brake device 7 is relocated to a position outside of the generator 4. Yet, the overall layout substantially keeps the increase in axial length of the driving apparatus to a minimum by disposing the friction engagement materials inside a coil end 40*a* of the generator 4 and building the hydraulic servo into a cover of the driving apparatus case 9.

While the invention has been described with reference to the two embodiments thereof, it is to be understood that the invention is not limited to these embodiments, rather, various changes and modifications may be made in the invention without departing from the spirit and scope thereof.

What is claimed is:

1. A driving apparatus provided with an electric motor and a differential device that are disposed in a mutually parallel axial relationship, a gear train that operatively couples the electric motor and the differential device by a countershaft, and a hydraulic pressure generating device, the gear train comprising:

a counter drive gear disposed on an axis of the electric motor;

a counter driven gear disposed on the countershaft that runs parallel with the axis of the electric motor and engaged with the counter drive gear; and a differential drive pinion gear disposed on the countershaft and a differential ring gear disposed on an axis of the differential device that runs parallel with the countershaft and engaged with the differential drive pinion gear, wherein the hydraulic pressure generating device is disposed in a clearance space created between gears of the gear train with the gear train viewed in an axial direction.

2. The driving apparatus according to claim 1, wherein the electric motor, the gear train, and the differential device are housed in a case for the driving apparatus, wherein the case for the driving apparatus is provided with an intermediate wall that separates at least an electric motor chamber, in which the electric motor is housed, from a gear chamber that houses the gear train with the hydraulic pressure generating device embedded in the intermediate wall.

3. The driving apparatus according to claim 2, further comprising a valve body, in which a circuit is formed for distributing oil pressure generated by the hydraulic pressure generating device into the electric motor chamber and the gear chamber, wherein the valve body is provided in a fixed condition in the intermediate wall to cover the hydraulic pressure generating device.

4. The driving apparatus according to claim 3, further comprising an engine, wherein the gear train is disposed between the engine and the electric motor in a positional relationship in an axial direction.

5. The driving apparatus according to claim 4, further comprising a planetary gear set that mutually and operatively couples the engine, the electric motor, and the counter drive gear, wherein an isolating wall is provided in the case for the driving apparatus, defining a planetary chamber that accommodates the planetary gear set in cooperation with the intermediate wall.

6. The driving apparatus according to claim 5, further comprising a braking device that stops rotation of the electric motor through the supply of oil pressure generated by the hydraulic pressure generating device, wherein the braking device is disposed in the isolating wall.

7. The driving apparatus according to claim 2, further comprising a valve body, in which a circuit is formed for distributing oil pressure generated by the hydraulic pressure generating device into the electric motor chamber and the gear chamber, wherein the valve body is provided with the hydraulic pressure generating device built therein and is embedded in the intermediate wall.

8. The driving apparatus according to claim 7, further comprising an engine, wherein the gear train is disposed between the engine and the electric motor in a positional relationship in an axial direction.

9. The driving apparatus according to claim 8, further comprising a planetary gear set that mutually and operatively couples the engine, the electric motor, and the counter drive gear, wherein an isolating wall is provided in the case for the driving apparatus, defining a planetary chamber that accommodates the planetary gear set in cooperation with the intermediate wall.

10. The driving apparatus according to claim 9, further comprising a braking device that stops rotation of the electric motor through the supply of pressure oil generated by the hydraulic pressure generating device, wherein the braking device is disposed in the isolating wall.

11. The driving apparatus according to claim 1, wherein the hydraulic pressure generating device overlaps with at least one of the gears in the gear train when viewing the gear train in a radial direction.

12. A driving apparatus, comprising:

an electric motor;

a gear train that operatively couples the electric motor to a wheel;

a case for housing both the electric motor and the gear train, the case provided with an intermediate wall that separates at least an electric motor chamber, in which the electric motor is housed, from a gear chamber that houses the gear train and an isolating wall that defines a separate chamber in either the electric motor chamber or the gear chamber in cooperation with the intermediate wall;

a hydraulic pressure generating device disposed in the intermediate wall; and a braking device, that stops rotation of the electric motor through the supply of oil pressure generated by the hydraulic pressure generating device, disposed in the isolating wall.

13. The driving apparatus according to claim 12, further comprising a planetary gear set that operatively couples the engine, the electric motor, and one of the gears in a gear train that operatively couples the electric motor to a wheel, wherein the planetary gear set is housed in the separate chamber.

14. The driving apparatus according to claim 12, further comprising an engine, wherein the gear train is disposed between the engine and the electric motor in a positional relationship in an axial direction.

* * * * *